United States Patent
Dede

[19]

[11] Patent Number: 6,135,639
[45] Date of Patent: Oct. 24, 2000

[54] FIXED ARC SQUEEZE FILM BEARING DAMPER

[75] Inventor: Mehmet M. Dede, West Chester, Ohio

[73] Assignee: General Electric Company, Cincinnati, Ohio

[21] Appl. No.: 09/221,403

[22] Filed: Dec. 28, 1998

[51] Int. Cl.[7] .................................................. F16C 27/04
[52] U.S. Cl. ........................................... 384/99; 384/581
[58] Field of Search ................................ 384/99, 535, 581

[56] References Cited

U.S. PATENT DOCUMENTS

| | | | |
|---|---|---|---|
| 3,844,630 | 10/1974 | Lechner | 384/99 |
| 4,214,796 | 7/1980 | Monzel et al. | |
| 4,222,617 | 9/1980 | Romberg | 384/99 |
| 5,149,206 | 9/1992 | Bobo | 384/99 |
| 5,316,391 | 5/1994 | Monzel | 384/99 |
| 5,344,239 | 9/1994 | Stallone et al. | 384/99 |
| 5,803,612 | 9/1998 | Battig | 384/99 |

*Primary Examiner*—Thomas R. Hannon
*Attorney, Agent, or Firm*—Andrew C. Hess; Nathan D. Herkamp

[57] ABSTRACT

A squeeze film damper (SFD) assembly whose chamber configuration reduces or eliminates the tendency for a bistable condition in a turbo machine shaft, such as the rotor shaft of a gas turbine engine. The SFD assembly generally entails a housing having a chamber whose wall circumscribes and contains a bearing assembly by which a shaft is rotatably supported. The bearing assembly is prevented from rotating with respect to the housing, but is otherwise free to move within the housing. An annulus is defined between the chamber wall and bearing assembly, and a fluid is contained within the annulus to support and damp the bearing assembly and its shaft. The chamber wall of the housing is not uniformly cylindrical, but instead is defined by at least two nonconcentric cylindrical wall portions.

20 Claims, 7 Drawing Sheets

FIXED ARC SQUEEZE FILM BEARING DAMPER

FIELD OF THE INVENTION

This invention pertains to vibration damping of rotating components, such as a rotor of a gas turbine engine. More particularly, this invention is related to a squeeze film damper for a roller bearing supporting a rotating shaft, in which the operation and effectiveness-of the squeeze film damper is improved by journaling the roller bearing in a housing with an interior chamber defined by nonconcentric cylindrical regions.

BACKGROUND OF THE INVENTION

Squeeze film bearing dampers are employed by high speed rotating machinery and particularly gas turbine engines to reduce and control vibration.

For some applications, squeeze film bearing dampers are accompanied by a flexible element in a parallel combination as a vibration isolator, so that the natural frequencies of the rotating system are artificially reduced to the extent that the speed range of high vibration amplitudes and transmitted forces are traversed well before the normal operating speed of the system is reached. In this manner, a squeeze film bearing damper acts simply as a device to reduce such amplitudes and transmitted forces to acceptable limits. Alternatively, squeeze film bearing dampers have been used alone between a bearing and its housing. Rotation of the outer race of any rolling element bearing is prevented by anti-rotation pins, called "dogs." In such an application, the role of the squeeze film bearing damper is solely one of damping with no intended effects on the natural frequencies of the rotating system. The resulting simpler mechanical design avoids the problem of fatigue in any introduced flexible element, and also reduces manufacturing costs.

In the rotor system of a gas turbine engine, a single ball bearing is typically used to carry thrust, while the remainder of the rotor is supported by two or more roller bearing assemblies.

The ball and roller bearing offer considerable load carrying capability but practically no damping. As is well known in the art, turbomachinery are prone to vibrations and dynamic loads caused by rotor and shaft unbalance and by self-excited whirl (i.e., dynamic instability). As a result, squeeze film bearing dampers have been widely used to damp shaft vibrations of gas turbine engines.

A conventional squeeze film damper (SFD) assembly 10 is shown in cross-section in FIG. 1. hose skilled in the art will appreciate that the assembly 10 is not shown to scale and is schematically represented for the sake of clarity. The assembly 10 includes a housing 12 having a cylindrical interior wall that defines a chamber 14, such that the chamber 14 has a uniform circular cross-section. The chamber 14 contains a bearing assembly 16, and the resulting annulus 18 defined between the housing 12 and bearing assembly 16 is filled with a semi-pressurized incompressible fluid, such as an oil. The bearing assembly 16 is typically a roller bearing whose inner race supports a shaft (not shown), the weight of which is indicated by the arrow "W" in FIG. 1. The outer race of the bearing assembly 16 has a cylindrical shape so that the housing 12 and bearing assembly 14 have a constant diametrical clearance, though the radial clearance and oil film thickness between the housing 12 and bearing assembly 16 will vary along the circumference of the bearing assembly 16 if the assembly 16 is not concentrically located within the chamber 14. In a conventional SFD, the outer race of the bearing assembly 16 is prevented from rotating relative to the housing 12, though radial and orbital movement of the bearing assembly 16 is permitted by providing much larger clearance between an anti-rotation device (e.g., pins or "dogs") and the outer race of the roller bearing.

During engine operation, the rotor is subjected to vibration which is transmitted to the bearing assembly 16 as an unbalance force $F_u$, which is reacted by the oil film forces whose radial and tangential components are $F_r$ and $F_t$ respectively. Accordingly, vibration of the engine rotor produces vibratory and orbital movement of the bearing assembly 16 within the chamber 14, causing the bearing assembly 16 to exert a squeezing action on the fluid, moving and distributing the fluid throughout the annulus. This motion generates a hydrodynamic pressure field in the oil film. When the pressure is integrated along and around the SFD oil film forces, the reaction forces $F_r$ and $F_t$ are developed radially and tangentially, respectively. The tangential force $F_t$ provides the desired damping, while the radial force $F_r$ provides the stiffness which lifts the rotor within the SFD oil chamber. The latter is also called the lift force. These oil film forces are very non-linear in nature and increase with decreasing oil film thickness.

From the above, it can be appreciated that the ability of the SFD assembly 10 to damp vibration in a rotor system decreases as the bearing assembly 16 (and therefore the rotor) moves away from the wall of the chamber 14 and toward a concentric position with respect to the chamber 14. This phenomenon is the result of a positive oil pressure being created in a converging region 20 of the chamber 14, identified with a heavy outline in FIG. 1. The location of this region 20 relative to the line of centers is determined by the shaft rotation direction ($\omega_r$, as a result of the orbital motion of the bearing assembly 16 within the chamber 14 induced by shaft vibration. The hydrodynamic pressure within the region 20 decreases as the radial gap diverges in the direction of shaft orbit (counterclockwise as depicted in FIG. 1). The remaining portion of the chamber 14 opposite the region 20 is generally at a negative pressure. As the radial gap between the bearing assembly 16 and the wall of the housing 12 increases, there is a decrease in the damping achieved by the squeeze effect of the rotor on the fluid film between the bearing assembly 16 and housing 12. Accordingly, the damping capability of the SFD assembly 10 is at a maximum when the bearing assembly 16 is immediately adjacent the chamber wall because of the greater positive fluid pressure generated within the converging annular gap between the bearing assembly 16 and wall of the chamber 14.

Rotating shafts supported in the manner shown in FIG. 1 are often subject to what is termed the "jump phenomenon" between two stable vibration modes. The jump phenomenon is illustrated in FIG. 2 with a graph plotting vibration amplitude versus frequency, with the frequency $\omega_1$ shown as having a bistable response between amplitudes $A_1$ and $A_2$. These amplitudes are. both possible and stable, and the rotor can "jump" between these amplitudes in response to small external disturbances. However, in rotating machinery such as the rotor of a gas turbine engine, only one stable amplitude is desirable to promote the service life of the rotor and other engine components. Some oil supply pressure control aschemes involving check valves may reduce the possibility of bistable rotor operation, but these designs are complicated and expensive, and are also susceptible to unexpected malfunctions.

Thus, it would be desirable if a turbo machine shaft support system were available by which improved shaft vibration damping was achieved without contributing to bistable vibration and without complicated hardware and control requirements.

SUMMARY OF THE INVENTION

This invention is directed to a squeeze film damper (SFD) assembly whose chamber configuration reduces or eliminates the tendency for a bistable condition in a turbomachine shaft, such as the rotor shaft of a gas turbine engine. The SFD system is also able to provide greater lift and damping of a shaft without requiring any modification to the shaft or its bearings, and without requiring additional support components or pressure controls.

The SFD system of this invention generally entails a housing having a chamber whose wall circumscribes and contains a bearing assembly by which a shaft is rotatably supported. As is conventional with SFD systems of the prior art, the bearing assembly is prevented from rotating with respect to the housing, but is otherwise free to move within the housing. An annulus is defined between the chamber wall and bearing assembly, and a fluid is contained within the annulus to support and damp the bearing assembly and its shaft. According to this invention, the chamber wall of the housing is not uniformly cylindrical as with prior art SFD systems, but instead is defined by at least two nonconcentric cylindrical wall portions. The cylindrical wall portions may be axially spaced within the housing so that a cross-section through any given location of the housing is circular, though the axes of symmetry of the individual cylindrical wall portions are offset relative to each other. Alternatively, the cylindrical wall portions may overlap or coincide at an axial location within the housing so that the annulus has a cross-section whose perimeter is defined by lobes, or more particularly, intersecting arcs, each corresponding to one of the cylindrical wall portions, having different axes.

Based on the configuration of the SFD chamber described above, regardless of its location within the chamber, the bearing assembly is never a constant radial distance from the chamber wall because of the converging-diverging shape of the annulus defined by the nonconcentric cylindrical wall portions of the chamber wall. As a result, the bearing assembly is always relatively adjacent to at least two of the nonconcentric cylindrical wall portions, and is spaced apart from the wall portions by converging annular gaps. When orbital movement of the bearing assembly is induced by shaft vibration, a positive fluid pressure is dynamically generated within each of the converging annular gaps. The bearing assembly is therefore subject to a hydrodynamic preload regardless of the position of the bearing assembly within the chamber. This hydrodynamic preload reduces or eliminates the tendency for the shaft supported by the bearing assembly to operate in a bistable mode.

The lobed configuration of the SFD chamber also increases damping, lift and shaft support stiffness as compared to prior art SFD assemblies. For gas turbine engine shafts, better control of rotor modes can be achieved by designing the lobe configuration to provide a lower stiffness in any given direction. The chamber configuration can also be adapted to reduce the amplitude of vibration when running at resonance by separating the resonances in two orthogonal planes. Higher rotor lift is able to reduce shaft vibration, particularly at lower engine speeds. The greater lift available with this invention also can eliminate the need for a squirrel cage or centralizing spring to maintain the shaft close to concentricity with the chamber, and therefore has the potential for eliminating the requirement for oil supply pressure boosters. Maximum hydrodynamic oil pressure is also lower than that for conventional SFD assemblies, reducing the surface finish requirements for the SFD chamber walls. Additional benefits include positioning the rotor shaft closer to the axial centerline of the engine, greater minimum oil film thickness thereby reducing oil temperature, reduced transmitted loads across the SFD bearing thereby reducing structureborne noise, and improved response to thermal distortions such as bowed rotors. For low speed, heavy rotor applications, a four lobed configuration with two lobes in the lower half and two lobes in the upper half of the chamber, a greater lift off force is generated at lower rotor speeds, thereby improving the operation of heavy, low speed rotor systems.

Other objects and advantages of this invention will be better appreciated from the following detailed description.

DETAILED DESCRIPTION OF THE INVENTION

Figure 3:
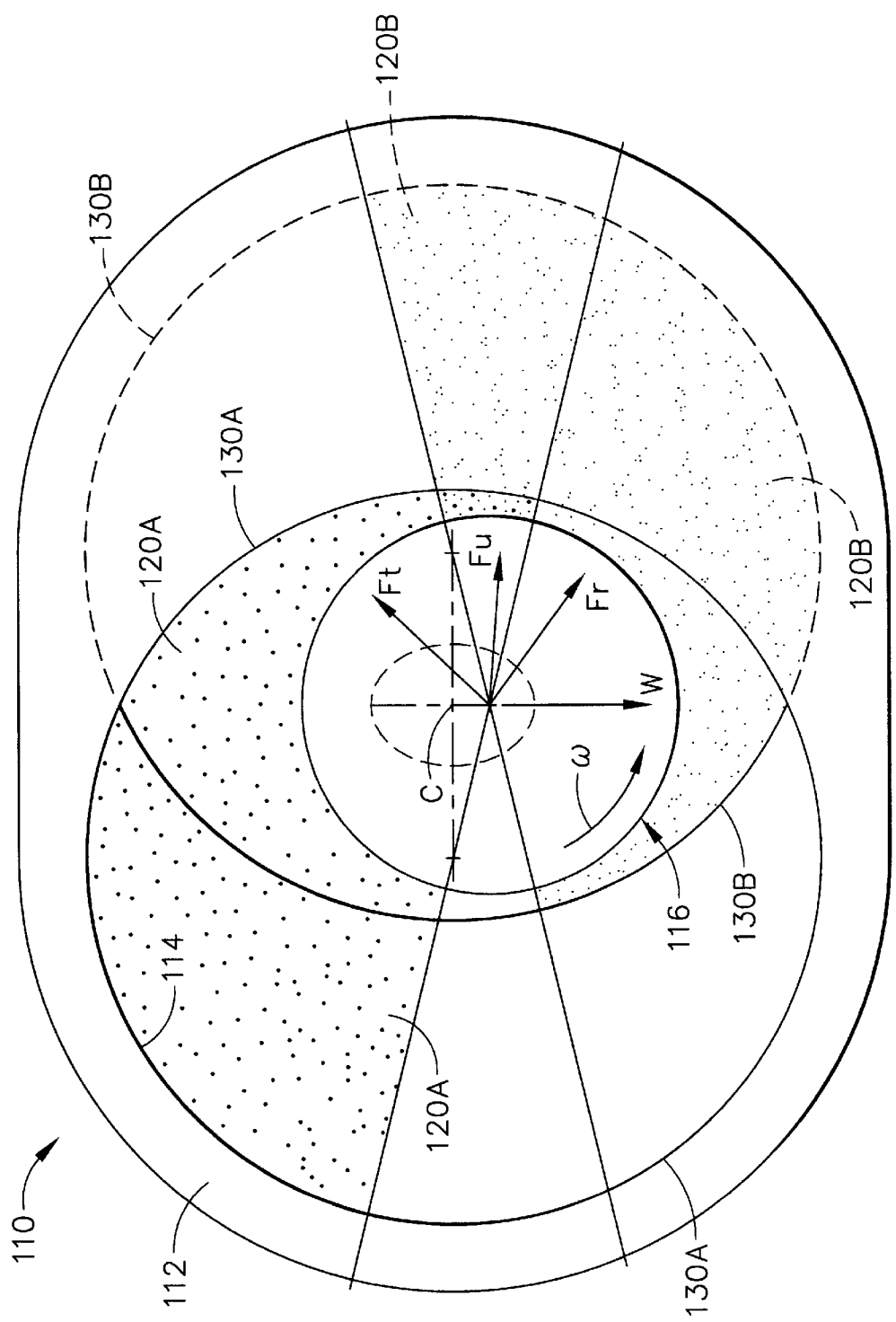
FIG. 3 is an axial end view of a squeeze film damper assembly in accordance with a first embodiment of this invention.
Figure 4:
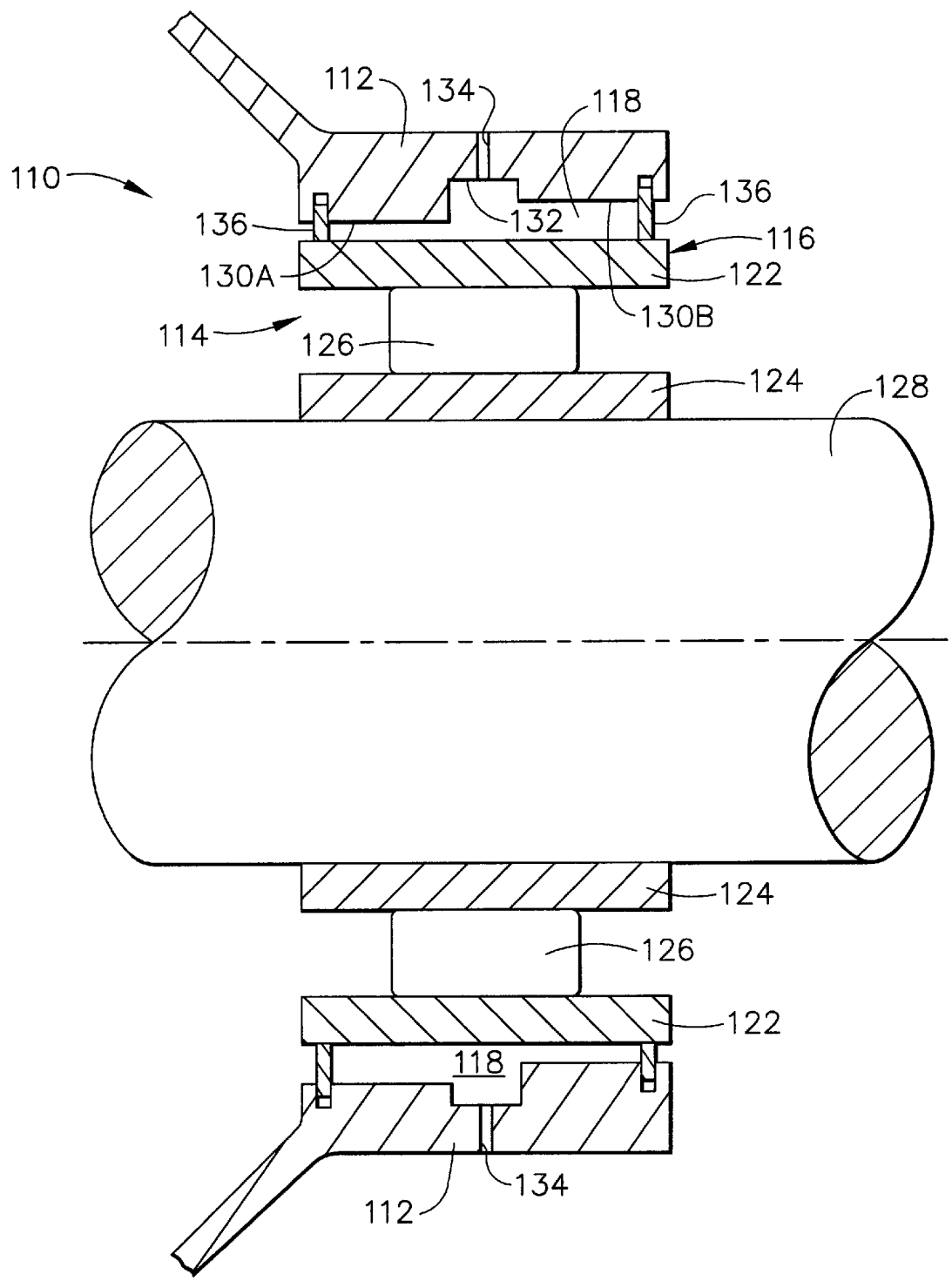
FIG. 4 is a cross-sectional view of the squeeze film damper assembly of FIG. 3 along section line 4—4.

A squeeze film damper (SFD) assembly 110 in accordance with a first embodiment of this invention is shown in FIGS. 3 and 4. The SFD assembly 110 includes a housing 112 having an interior chamber 114. A bearing assembly 116 is schematically shown within the chamber 114 in FIG. 3. In FIG. 4, the bearing assembly 116 is generally shown as being a conventional roller bearing consisting of an outer race 122, and inner race 124, and a number of roller elements 126 therebetween. A shaft 128 is shown as being rotatably supported by the inner race 124. The present invention is particularly well suited for gas turbine engine applications, in which case the shaft 128 would be a rotor shaft that connects turbine and compressor sections of a gas turbine engine, as is known in the art. The housing 112 and the outer race 122 of the bearing assembly 116 define therebetween an irregular annular-shaped cavity 118 which contains a semi-pressurized incompressible damping fluid, such as an oil or any other suitable damping medium. As is conventional with SFD devices, the outer race 122 of the bearing assembly 116 is prevented from rotating relative to the housing 112, such that rotation is limited to the inner race 124 and shaft 128, though the entire bearing assembly 116 and its shaft 128 are free to move radially and orbitally within the chamber 114 in response to vibrations and dynamic loads on the shaft 128.

Figure 1:
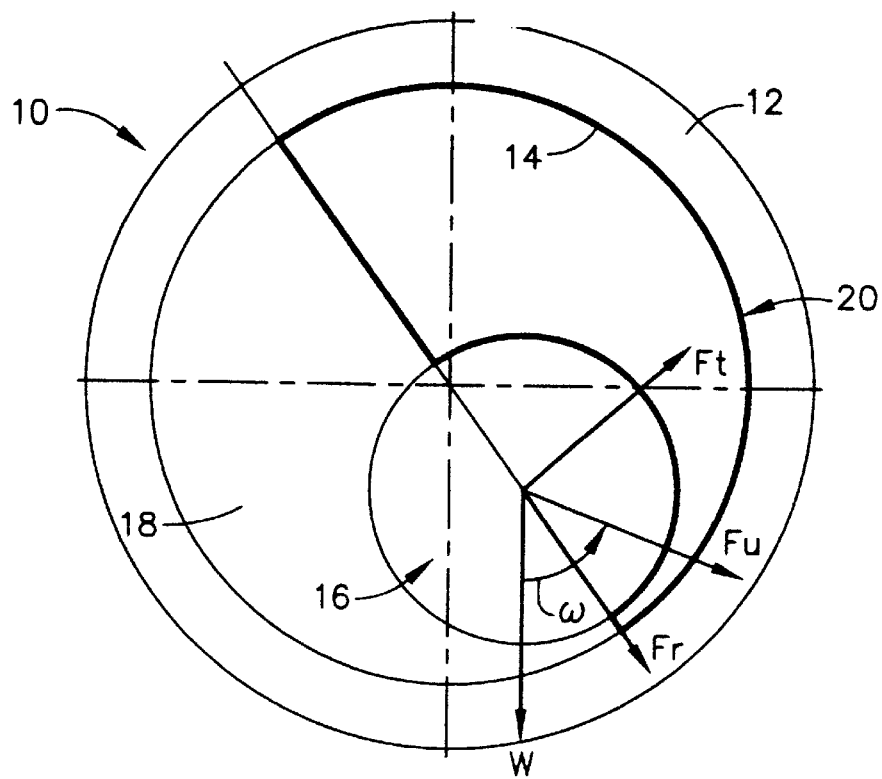
FIG. 1 is an axial end view of a squeeze film damper assembly in accordance with the prior art.
Figure 2:
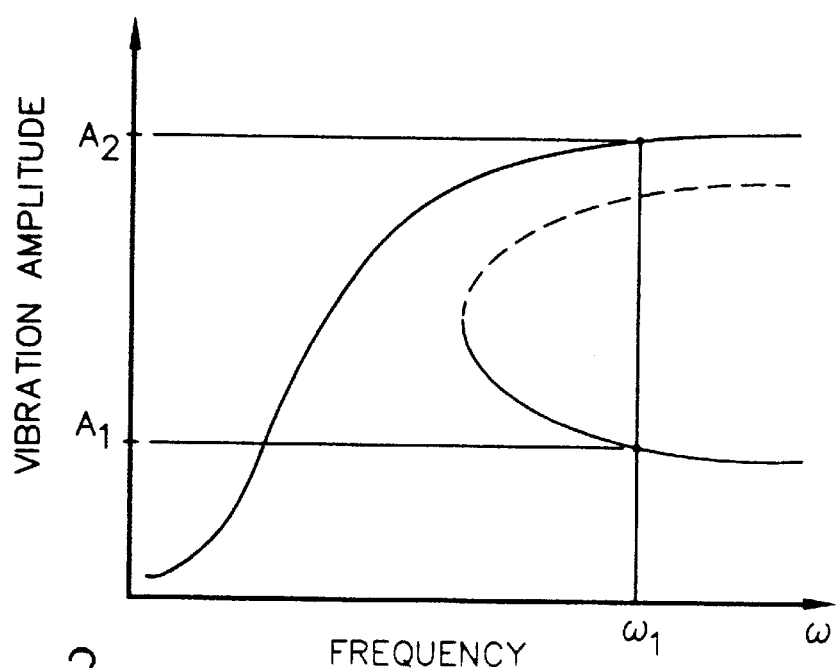
FIG. 2 is a graph depicting the bistable vibration phenomenon of the squeeze film damper assembly of FIG. 1.

A comparison of FIGS. 1 and 3 evidences the marked difference between the irregular chamber 114 of the SFD assembly 110 of this invention and the uniformly cylindrical chamber 14 of the prior art. As depicted, the chamber 114 is formed by a pair of nonconcentric cylindrical regions 130A and 130B spaced axially relative to each other. The axes of the cylindrical regions are preferably parallel to the axis of rotation of the bearing assembly 116 and parallel to the centerline "C" of the housing 112, the latter of which is nominally the axis of the chamber 114. Though not required by this invention, the axes of the cylindrical regions 130A and 130B are shown as being equidistant and equiangular spaced from the centerline "C" of the housing 112.

A groove 132 shown in FIG. 4 as separating the cylindrical regions 130A and 130B is omitted in FIG. 3 for clarity. The groove 132 can be concentric with the centerline C of the housing 112 indicated in FIG. 3. In FIG. 4, a number of inlets 134 are shown through which the pressurized fluid is supplied to the chamber 114. Also shown in FIG. 4 but omitted from FIG. 3 is a pair of ring seals 136 that serve to retain the fluid within the chamber 114. The groove 132 and seals 134 are known in the art but not required by this invention, and can be omitted if the particular application or circumstances require.

The SFD assembly 110 of FIGS. 3 and 4 will be termed a two-lobe SFD as a result of the two nonconcentric cylindrical regions 130A and 130B defining two eccentric lobes when viewed from the perspective of FIG. 3. The bearing assembly 116 can be supported by only limited portions of the cylindrical regions 130A and 130B —namely, the innermost arcuate wall portions visible in FIG. 3.

The effect of the cylindrical regions 130A and 130B on the hydrodynamic characteristics of the SFD assembly 110 are represented in FIG. 3 by the coexistence of two positive pressure regions 120A and 120B generated within the cylindrical regions 130A and 130B, respectively. The pressure regions 120A and 120B are schematically distinguished from each other by the use of coarser and finer dot patterns in FIG. 3. Considering only the cylindrical region 130A, the positive pressure region 120A is on one side of the line of centers between the bearing assembly 116 and the cylindrical region 130A. The pressure region 120A occurs as a result of the rotation ω of the shaft 128 and the converging-diverging radial gap between the bearing assembly 116 and the wall of the cylindrical region 130A. Simultaneously, the pressure region 120B exists within the cylindrical region 130B. From FIG. 3, one skilled in the art will appreciate that the positive pressure regions 120A and 120B contribute to each other in reacting to the motion of the shaft bearing assembly 116. One skilled in the art will also appreciate that two contributing converging-diverging regions exist within the chamber 114 regardless of the position of the bearing assembly 116 within the chamber 114.

As a result of the above, the tangential and radial force components ($F_r$ and $F_t$, respectively, in FIG. 3) of any shaft imbalance ($F_u$ in FIG. 3) will be met with both of the positive pressure regions 120A and 120B. The reaction of the pressurized fluid within the pressure regions provide damping and stiffness to the rotor system. Simultaneously, the hydrodynamically-pressurized fluid within the pressure region 120A serves to preload the bearing assembly 116 and its shaft 128 toward the pressure region 120B. Accordingly, the SFD assembly 110 of this invention is able to damp vibration in the shaft 128 regardless of the position of the bearing assembly 116 within the chamber 114, because the. bearing assembly 116 is always adjacent one of the cylindrical regions 130A and 130B of the chamber 114, where the positive fluid pressures 120A and 120B are generated within their respective converging annular gaps between the bearing assembly 116 and walls of the wall portions 130A and 130B.

While the cylindrical regions 130A and 130B are shown in FIG. 4 as being axially spaced from each other, the same hydrodynamic benefits of this invention occur if the cylindrical regions 130A and 130B are superimposed on each other, i.e., they overlap or coincide at the same axial location within the housing 112 so that the chamber 114 has a cross-section whose perimeter is defined by intersecting arcs with different but parallel axes.

A benefit of this approach is that, for a given housing axial length, a single multi lobed chamber would be present having a land whose length is the sum of the individual land lengths of the two axially spaced-apart cylindrical regions 130A and 130B in FIG. 4. Also, while the SFD assembly 110 is shown in FIG. 3 as being oriented horizontally with respect to gravity, the assembly 110 could be vertically oriented, though with reduced lift.

Figure 5:
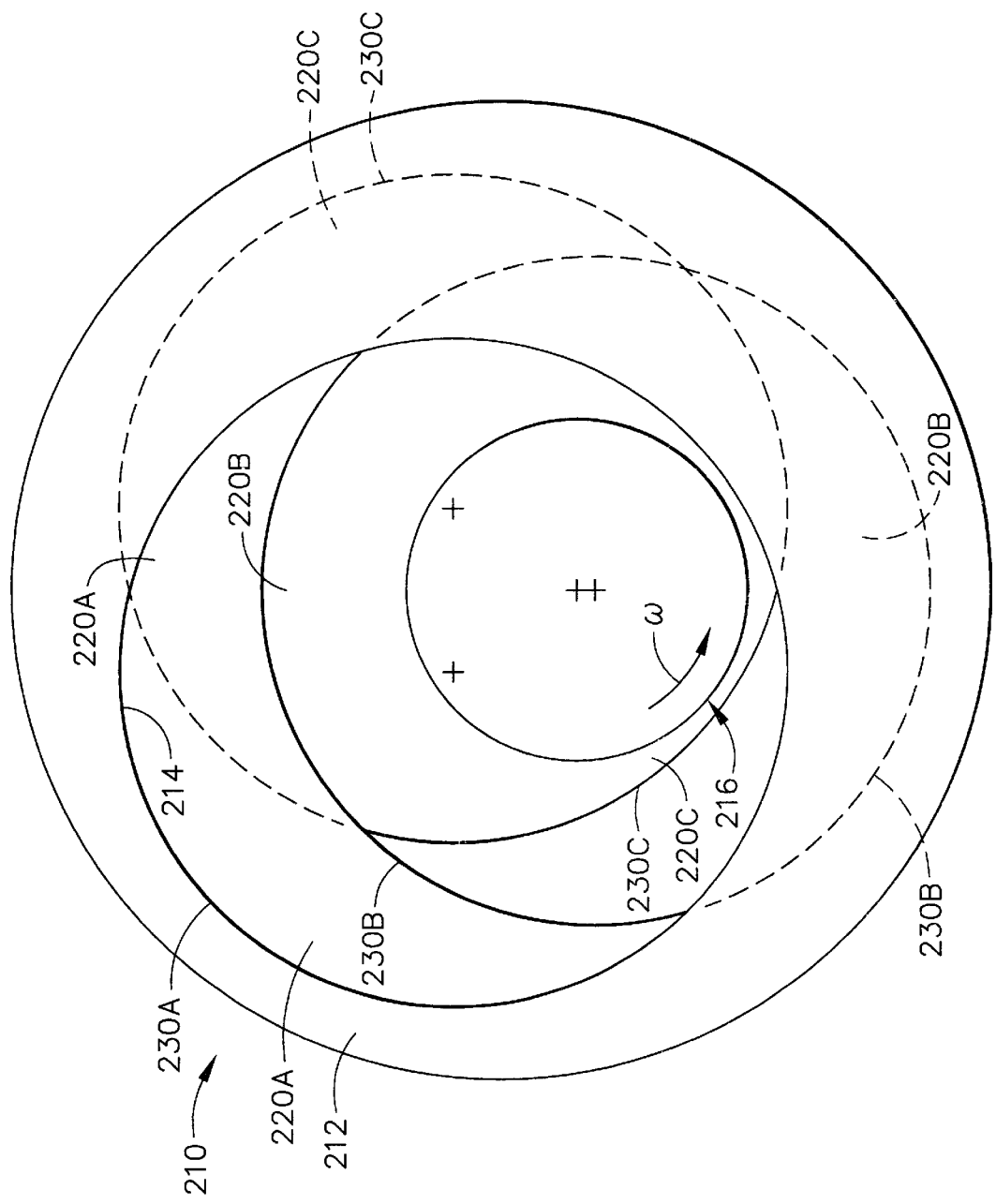
FIGS. 5 and 6 are axial end views of squeeze film damper assemblies in accordance with alternative embodiments of this invention.
Figure 6:
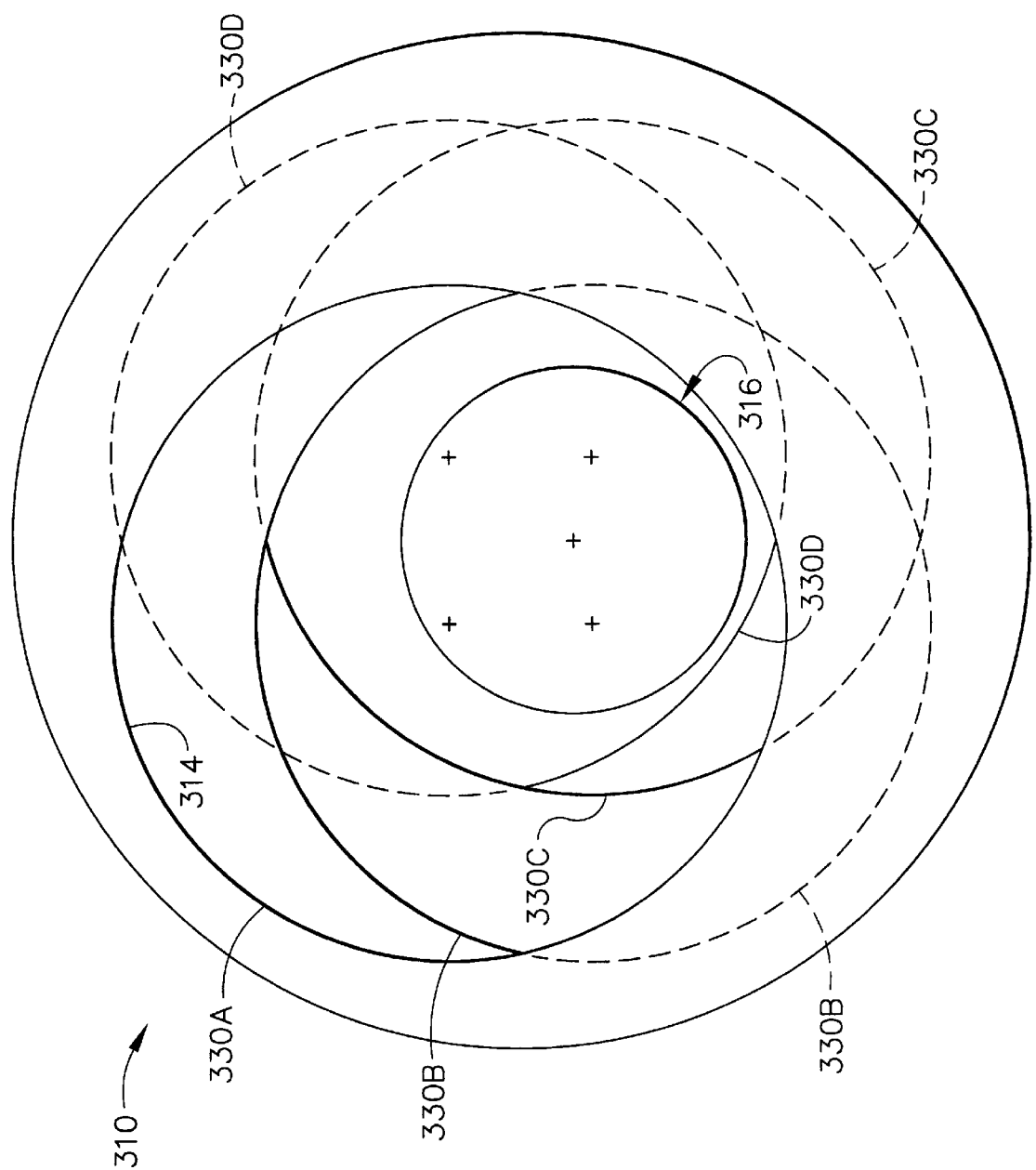
Figure 7:
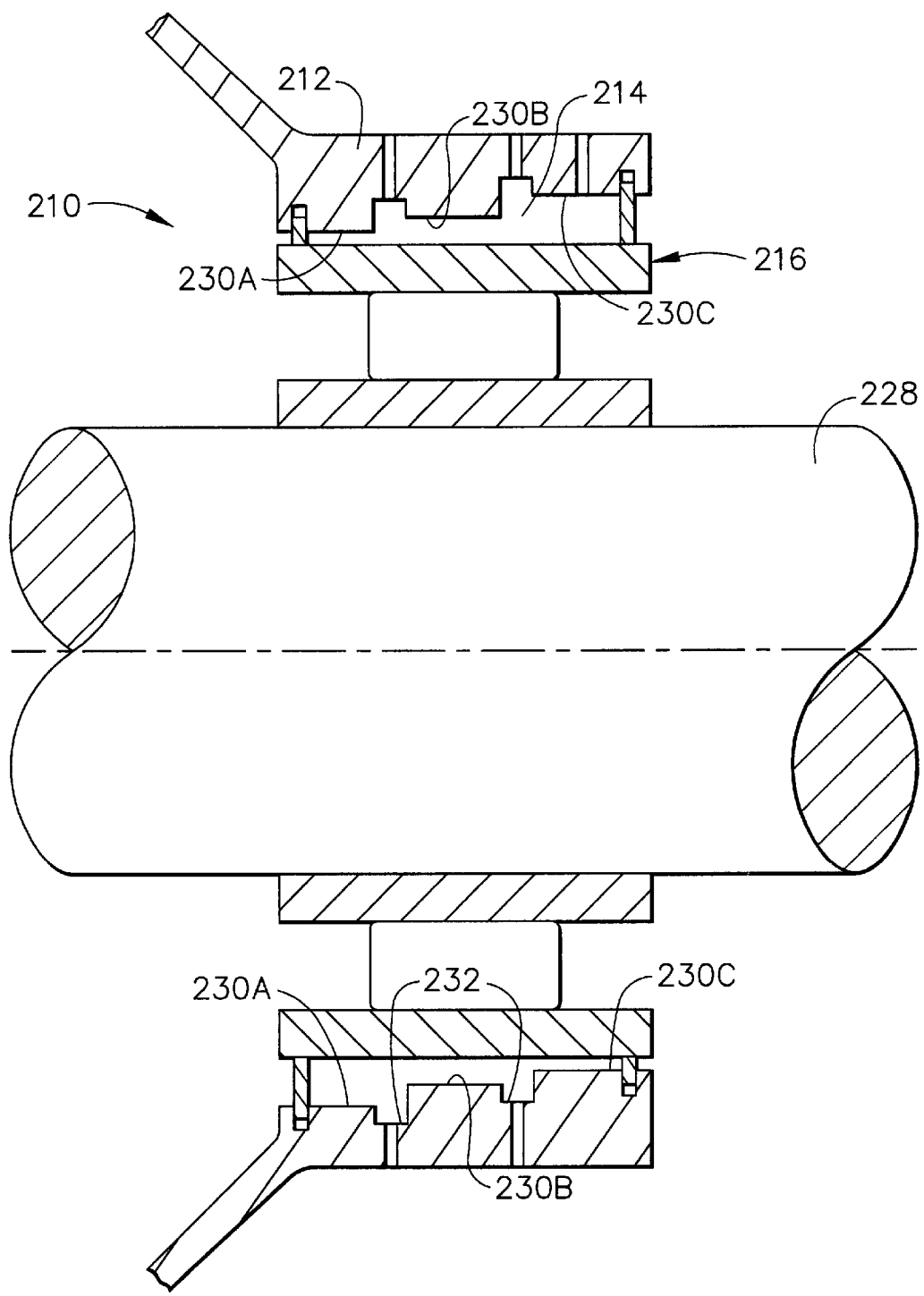
FIG. 7 is a cross-sectional view of the squeeze film damper assembly of FIG. 5 along section line 7—7.

Shown in FIGS. 5 and 6 are second and third embodiments of this invention. FIG. 5 is of a SFD assembly 210 having a housing 212 with a three-lobed configuration as a result of the chamber 214 being defined by three nonconcentric cylindrical regions 230A, 230B and 230C. As with the embodiment of FIGS. 3 and 4, the SFD assembly 210 includes a roller bearing assembly 216 that supports a rotating shaft 228, as more particularly shown in FIG. 7. Two concentric grooves 232 in the chamber wall of the housing 212 separate the cylindrical regions 230A, 230B and 230C. The most important difference between the SFD assemblies 110 and 210 is that the latter has three positive pressure regions 220A, 220B and 220C corresponding to the three cylindrical regions 230A, 230B and 230C, respectively. The SFD assembly 310 of FIG. 6 has a four-lobed configuration as a result of its chamber 314 being defined by three nonconcentric cylindrical regions 330A, 330B, 330C and 330D, resulting in the generation of four positive pressure regions surrounding the bearing assembly 316. The two-lobed and three-lobed configurations of the SFD assemblies 110 and 210 are believed to be preferred over the four-lobed configuration of FIG. 6, since higher numbers of lobes diminish the benefit of having preload in the SFD. Consequently, SFD assemblies with more than four lobes are within the scope of this invention, but are not believed to offer the operational benefits of the embodiments of FIGS. 3 through 6.

Figure 8:
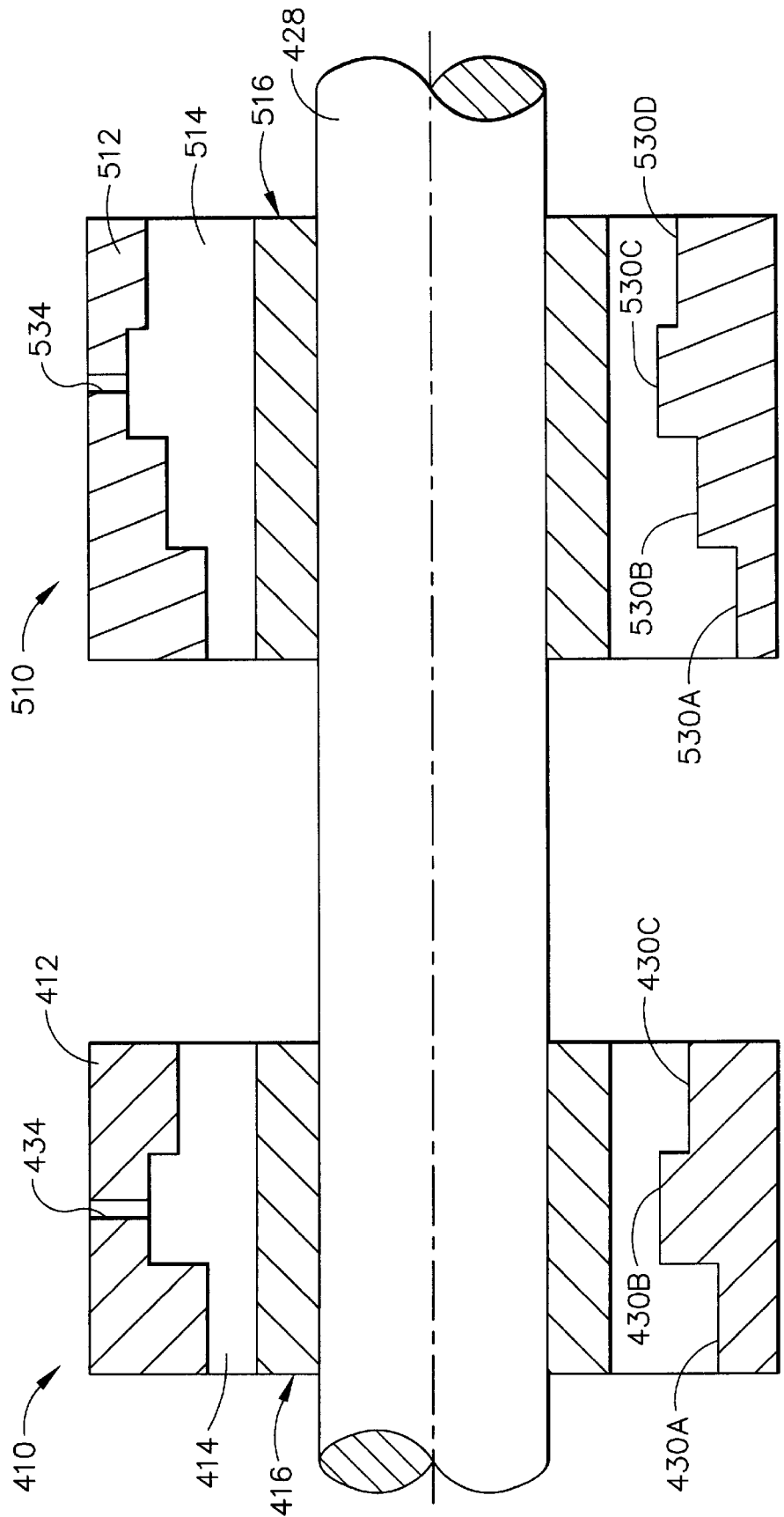
FIG. 8 is a cross-sectional view of a pair of alternative squeeze film damper assemblies in accordance with this invention.

Finally, FIG. 8 represents a cross-sectional view of an SFD system that includes two SFD. assemblies 410 and 510 with roller bearing assemblies 416 and 516 that support a single shaft 428. The SFD assembly 410 has a chamber 414 with a three-lobed configuration defined by three nonconcentric cylindrical regions 430A, 430B and 430C. The chamber 514 of the SFD assembly 510 has a four-lobed configuration defined by four nonconcentric cylindrical regions 530A, 530B, 530C and 530D. In the absence of grooves, pressurized fluid is supplied to the chambers 414 and 514 through inlets 434 and 534 located at the maximum-clearance/low-pressure regions of the cylindrical regions, e.g., 430B and 530C.

The intent of FIG. 8 is to illustrate that, in accordance with this invention, any number of SFD assemblies can be used to support a shaft, that the assemblies need not be paired based on having a similar lobe configuration, and that the cylindrical regions that define the housing chamber do not need to be arranged in any particular manner.

Instead, what is important is that at least two arcuate wall portions exist whose axes are offset from each other so that contributing positive pressure regions develop within the chamber when the supported shaft orbits within the SFD.

While the invention has been described in terms of a preferred embodiment, it is apparent that other forms could be adopted by one skilled in the art. Accordingly, the scope of the invention is to be limited only by the following claims.

What is claimed is:

1. A squeeze film damper assembly comprising:

a bearing assembly having an axis of rotation;

a housing having an axial centerline and circumscribing the bearing assembly, the housing having an interior wall opposing the bearing assembly so as to define an annulus therebetween, the interior wall being defined by at least two nonconcentric cylindrical wall portions;

a fluid within the annulus; and means for preventing rotation of the bearing assembly with respect to the housing.

2. A squeeze film damper assembly according to claim 1, wherein each of the cylindrical wall portions has an axis of symmetry substantially parallel to the axis of rotation of the bearing assembly.

3. A squeeze film damper assembly according to claim 1, wherein the cylindrical wall portions are axially spaced within the housing.

4. A squeeze film damper assembly according to claim 1, wherein the cylindrical wall portions coincide at an axial location within the housing so that the annulus has a cross-section whose perimeter is defined by intersecting arcs with different axes, the intersecting arcs being equal in number to the cylindrical wall portions.

5. A squeeze film damper assembly according to claim 1, wherein each of the cylindrical wall portions has an axis of symmetry, the axes of symmetry of the cylindrical wall portions being equidistant from the centerline of the housing and equiangularly spaced around the centerline of the housing.

6. A squeeze film damper assembly according to claim 1, wherein there are two of the nonconcentric cylindrical wall portions that define the interior wall of the housing, and each of the two cylindrical wall portions has an axis of symmetry substantially parallel to the axis of rotation of the bearing assembly.

7. A squeeze film damper assembly according to claim 1, wherein there are three of the nonconcentric cylindrical wall portions that define the interior wall of the housing, and each of the three cylindrical wall portions has an axis of symmetry substantially parallel to the axis of rotation of the bearing assembly.

8. A squeeze film damper assembly according to claim 1, further comprising a groove in the interior wall of the housing.

9. A squeeze film damper assembly according to claim 8, further comprising an inlet disposed in the groove for supplying the fluid to the annulus.

10. A squeeze film damper assembly according to claim 1, further comprising a plurality of nonconcentric grooves in the interior wall of the housing.

11. A squeeze film damper assembly comprising:

a roller bearing assembly comprising an inner race having an axis of rotation, an outer race circumscribing the inner race, and a plurality of roller elements between the inner and outer races;

a housing having an axial centerline and circumscribing the roller bearing assembly, the. housing having an interior wall opposing the outer race of the roller bearing assembly so as to define an annulus therebetween, the interior wall being defined by at least two nonconcentric cylindrical wall portions, each of the cylindrical wall portions having an axis of symmetry substantially parallel to the axis of rotation of the inner race, the axes of symmetry of the cylindrical wall portions being substantially equidistant from the centerline of the housing and substantially equiangularly spaced around the centerline of the housing;

means for preventing rotation of the outer race with respect to the housing;

a pressurized fluid within the annulus;

sealing elements confining the pressurized fluid within the annulus and in sliding contact with the outer race of the roller bearing assembly; and a gas turbine engine shaft supported within the inner race of the roller bearing assembly.

12. A squeeze film damper assembly according to claim 11, wherein the cylindrical wall portions are axially spaced within the housing.

13. A squeeze film damper assembly according to claim 12, wherein the cylindrical wall portions have substantially equal axial lengths.

14. A squeeze film damper assembly according to claim 11, wherein the cylindrical wall portions coincide at an axial location within the housing so that the annulus has a cross-section whose perimeter is defined by intersecting arcs with different axes, the intersecting arcs being equal in number to the cylindrical wall portions.

15. A squeeze film damper assembly according to claim 11, further comprising:

a second roller bearing assembly comprising an inner race having an axis of rotation, an outer race circumscribing the inner race, and a plurality of roller elements between the inner and outer races, the gas turbine engine shaft being supported within the inner race of the second roller bearing assembly;

a second housing having an axial centerline and circumscribing the second roller bearing assembly, the second housing having an interior wall opposing the outer race of the second roller bearing assembly so as to define an annulus therebetween, the interior wall being defined by at least three nonconcentric cylindrical wall portions, each of the cylindrical wall portions having an axis of symmetry substantially parallel to the axis of rotation of the inner race, the axes of symmetry of the cylindrical wall portions being substantially equidistant from the centerline of the housing and substantially equiangularly spaced around the centerline of the housing;

means for preventing rotation of the outer race of the second roller bearing assembly with respect to the second housing; and a pressurized fluid within the annulus defined between the second housing and the outer race of the second roller bearing assembly.

16. A squeeze film damper assembly according to claim 11, further comprising a groove in the interior wall of the housing.

17. A squeeze film damper assembly according to claim 16, further comprising an inlet disposed in the groove for supplying the pressurized fluid to the annulus.

18. A squeeze film damper assembly according to claim 11, wherein at least three nonconcentric cylindrical wall portions define the interior wall of the housing, the squeeze film damper assembly further comprising grooves in the interior wall of the housing, each of the grooves being disposed between an adjacent pair of the nonconcentric cylindrical wall portions.

19. A squeeze film damper assembly according to claim 18, wherein the grooves are nonconcentric.

20. A squeeze film damper assembly comprising:

a roller bearing assembly comprising an inner race having an axis of rotation, an outer race circumscribing the inner race, and a plurality of roller elements between thinner and outer races;

a housing having an axial centerline and circumscribing the roller bearing assembly, the housing having an interior wall opposing the outer race of the roller bearing assembly so as to define an annulus therebetween, the interior wall being defined by at least two nonconcentric cylindrical wall portions, each of the cylindrical wall portions having an axis of symmetry substantially parallel to the axis of rotation of the inner race, the axes of symmetry of the cylindrical wall portions being substantially parallel to and equidistant from the centerline of the housing and substantially equiangularly spaced around the centerline of the housing, the cylindrical wall portions being axially spaced within the housing;

means for preventing rotation of the outer race with respect to the housing;

a pressurized fluid within the annulus;

sealing elements confining the pressurized fluid within the annulus and in sliding contact with the outer race of the roller bearing assembly; and a gas turbine engine shaft supported within the inner race of the roller bearing assembly.

* * * * *